(12) United States Patent
Aguilera Bonet et al.

(10) Patent No.: US 11,722,849 B2
(45) Date of Patent: Aug. 8, 2023

(54) DEVICE AND METHOD FOR THE UNAMBIGUOUS IDENTIFICATION OF WI-FI DEVICES

(71) Applicant: AOIFE SOLUTIONS, S.L., Camas (ES)

(72) Inventors: Pablo Aguilera Bonet, Camas (ES); Jose Ayub Gonzalez Garrido, Camas (ES); Jose Antonio Delgado Alfonso, Camas (ES)

(73) Assignee: AOIFE SOLUTIONS, S.L., Camas (ES)

( * ) Notice: Subject to any disclaimer, the term of this patent is extended or adjusted under 35 U.S.C. 154(b) by 99 days.

(21) Appl. No.: 17/598,452

(22) PCT Filed: Dec. 27, 2019

(86) PCT No.: PCT/EP2019/087055
§ 371 (c)(1),
(2) Date: Sep. 27, 2021

(87) PCT Pub. No.: WO2021/104657
PCT Pub. Date: Jun. 3, 2021

(65) Prior Publication Data
US 2022/0167123 A1    May 26, 2022

(30) Foreign Application Priority Data
Nov. 27, 2019   (ES) .............................. ES201931047

(51) Int. Cl.
*H04W 4/029*     (2018.01)
*H04L 5/00*      (2006.01)
*G06F 18/23213*  (2023.01)

(52) U.S. Cl.
CPC ...... *H04W 4/029* (2018.02); *G06F 18/23213* (2023.01); *H04L 5/0048* (2013.01)

(58) Field of Classification Search
CPC ..... H04W 4/029; H04W 12/02; H04W 12/69; G06F 18/23213; H04L 5/0048; H04L 63/0421; H04L 63/1466
See application file for complete search history.

(56) References Cited

U.S. PATENT DOCUMENTS

2020/0273326 A1*  8/2020  Shotton ................ G08G 1/0145

OTHER PUBLICATIONS

Vanhoef et al., "Why MAC Address Randomization is not Enough: An Analysis of Wi-Fi Network Discovery Mechanisms", ASIA CCS '16, 2016, pp. 413-424.

(Continued)

*Primary Examiner* — Kabir A Timory
(74) *Attorney, Agent, or Firm* — Lucas & Mercanti, LLP

(57) ABSTRACT

A device and method for the unambiguous identification of Wi-Fi devices is disclosed, by receiving probe request frames sent by Wi-Fi devices, extracting a set of features from a plurality of fields of each probe request frame, assigning a footprint to each probe request frame based on the extracted set of features, for each footprint, performing a cluster analysis on a time series of the sequence numbers included in the header of the probe request frames associated with the corresponding footprint, obtaining at least one cluster per footprint, identifying a Wi-Fi device for each different cluster, which identifies Wi-Fi devices that are not connected to a Wi-Fi network and employ MAC address randomization.

18 Claims, 19 Drawing Sheets

(56) References Cited

OTHER PUBLICATIONS

Robyns et al., "Noncooperative 802.11 MAC Layer Fingerprinting and Tracking of Mobile Devices", Security and Communication Networks, 2017, vol. 2017, pp. 1-21.
Loh et al., "Identifying Unique Devices through Wireless Fingerprinting", WiSec '08, 2008, pp. 46-55.
International Search Report and Written Opinion for Corresponding International Application No. PCT/EP2019/087055, 9 Pages, dated May 20, 2020.

* cited by examiner

| | PRE-PROCESSING 402 | | | | | | | | | | | | |
|---|---|---|---|---|---|---|---|---|---|---|---|---|---|
| receive Probe Request | | feature extraction | | | | | | | | | | | |
| | | Footprint | | | | | | | | | | | |
| Num | source MAC | f1 | f2 | f3 | f4 | f5 | f6 | f7 | f8 | f9 | f10 | f11 | f12 |
| 1 | DAA119325692 | 14328089 | 3298962 | 33819414 | 202512420 | 810049644 | 0 | 0 | 0 | 0 | 0 | 0 | 0 |
| 2 | E626FE1C0616 | 15083262 | 1836566 | 33819414 | 75849373 | 810049644 | 0 | 40103505 | 42781900 | 0 | 0 | 0 | 0 |
| 3 | DAA119325692 | 14328089 | 3298962 | 33819414 | 202512420 | 810049644 | 0 | 0 | 0 | 0 | 0 | 0 | 0 |
| 4 | DAA119325692 | 14328089 | 3298962 | 33819414 | 202512420 | 810049644 | 0 | 0 | 0 | 0 | 0 | 0 | 0 |
| 5 | DAA11956F958 | 14328089 | 5699928 | 33819414 | 0 | 202512420 | 95409843 | 75045375 | 0 | 67111426 | 20971584 | 4826463 | 14734313 |
| 6 | DAA11976FC3B | 14328089 | 7797819 | 33819414 | 202512420 | 810049644 | 0 | 0 | 0 | 0 | 0 | 0 | 0 |
| 7 | DAA119DC6A0E | 14328089 | 14445070 | 33819414 | 0 | 202512420 | 95409843 | 75045375 | 0 | 67111426 | 20971584 | 4826463 | 14734313 |
| 8 | DAA1198F9CAA | 14328089 | 9411754 | 33819414 | 202512420 | 810049644 | 0 | 0 | 0 | 0 | 0 | 0 | 0 |
| 9 | DAA1945B0AD | 14328089 | 4567213 | 33819414 | 202512420 | 810049644 | 0 | 0 | 0 | 0 | 0 | 0 | 0 |
| 10 | DAA11945B0AD | 14328089 | 4567213 | 33819414 | 202512420 | 810049644 | 0 | 0 | 722654 | 0 | 0 | 0 | 0 |
| 11 | DAA1198F9CAA | 14328089 | 9411754 | 33819414 | 202512420 | 810049644 | 0 | 0 | 722654 | 4857293 | 0 | 0 | 0 |
| 12 | E626FE1C0616 | 15083262 | 1836566 | 33819414 | 75849373 | 810049644 | 0 | 40103505 | 42781900 | 0 | 0 | 0 | 0 |
| 13 | DAA11940FF49 | 14328089 | 4259657 | 33819414 | 202512420 | 810049644 | 0 | 0 | 722654 | 0 | 0 | 0 | 0 |
| 14 | DAA11956F958 | 14328089 | 5699928 | 33819414 | 0 | 202512420 | 95409843 | 75045375 | 0 | 67111426 | 20971584 | 4826463 | 14734313 |
| 15 | DAA119DC6A0E | 14328089 | 14445070 | 33819414 | 0 | 202512420 | 95409843 | 75045375 | 0 | 67111426 | 20971584 | 4826463 | 14734313 |
| 16 | DAA11953E155F | 14328089 | 87954783 | 33819414 | 202512420 | 810049644 | 0 | 0 | 0 | 0 | 0 | 0 | 0 |

Fig. 6

| receive Probe Request | | PRE-PROCESSING 402 feature extraction Footprint | | | | | | | | | | | CLASSIFICATION 404 |
|---|---|---|---|---|---|---|---|---|---|---|---|---|---|
| Num | source MAC | f1 | f2 | f3 | f4 | f5 | f6 | f7 | f8 | f9 | f10 | f11 | f12 | Fingerprint assignment |
| 1 | DAA119325692 | 14328089 | 3298962 | 33819414 | 2025124220 | 810049644 | 0 | 0 | 0 | 0 | 0 | 0 | 0 | Footprint 1 |
| 2 | E626FE1C0616 | 15083262 | 1826566 | 33819414 | 75849373 | 810049644 | 0 | 40103505 | 42781900 | 0 | 0 | 0 | 0 | Footprint 2 |
| 3 | DAA119325692 | 14328089 | 3298962 | 33819414 | 2025124220 | 810049644 | 0 | 0 | 0 | 0 | 0 | 0 | 0 | Footprint 1 |
| 4 | DAA119325692 | 14328089 | 3298962 | 33819414 | 2025124220 | 810049644 | 0 | 0 | 0 | 0 | 0 | 0 | 0 | Footprint 1 |
| 5 | DAA11956F958 | 14328089 | 5699920 | 33819414 | 0 | 2025124220 | 954098437 | 5045375 | 0 | 6711142620 | 971584 | 4826463 | 14734313 | Footprint 3 |
| 6 | DAA1976FC3B | 14328089 | 7797819 | 33819414 | 2025124220 | 810049644 | 0 | 0 | 0 | 0 | 0 | 0 | 0 | Footprint 1 |
| 7 | DAA119DC6A0E | 14328089 | 1445070 | 33819414 | 0 | 2025124220 | 954098437 | 5045375 | 0 | 6711142620 | 971584 | 4826463 | 14734313 | Footprint 3 |
| 8 | DAA11989CAA | 14328089 | 9411754 | 33819414 | 2025124220 | 810049644 | 0 | 0 | 0 | 0 | 0 | 0 | 0 | Footprint 1 |
| 9 | DAA11945B0AD | 14328089 | 4567213 | 33819414 | 2025124220 | 810049644 | 0 | 0 | 0 | 0 | 0 | 0 | 0 | Footprint 1 |
| 10 | DAA11945B0AD | 14328089 | 4567213 | 33819414 | 2025124220 | 810049644 | 0 | 0 | 722654 | 0 | 0 | 0 | 0 | Footprint 4 |
| 11 | DAA11989CAA | 14328089 | 9411754 | 33819414 | 2025124220 | 810049644 | 0 | 0 | 722654 | 4957293 | 0 | 0 | 0 | Footprint 5 |
| 12 | E626FE1C0616 | 15083262 | 1836566 | 33819414 | 75849373 | 810049644 | 0 | 40103505 | 42781900 | 0 | 0 | 0 | 0 | Footprint 2 |
| 13 | DAA11940FF49 | 14328089 | 4259657 | 33819414 | 2025124220 | 810049644 | 0 | 0 | 722654 | 0 | 0 | 0 | 0 | Footprint 4 |
| 14 | DAA11956F958 | 14328089 | 5699920 | 33819414 | 0 | 2025124220 | 954098437 | 5045375 | 0 | 6711142620 | 971584 | 4826463 | 14734313 | Footprint 3 |
| 15 | DAA119DC6A0E | 14328089 | 1445070 | 33819414 | 0 | 2025124220 | 954098437 | 5045375 | 0 | 6711142620 | 971584 | 4826463 | 14734313 | Footprint 3 |
| 16 | DAA11953E155F | 14328089 | 8754780 | 33819414 | 2025124220 | 810049644 | 0 | 0 | 0 | 0 | 0 | 0 | 0 | Footprint 1 |

Fig. 7

| | PRE-PROCESSING 402 | | | | | | | | | | | | | CLASSIFICATION 404 | |
|---|---|---|---|---|---|---|---|---|---|---|---|---|---|---|---|
| receive Probe Request | | feature extraction | | | | | | | | | | | | Initial footprint assignment | Reduced Footprints |
| | | Footprint | | | | | | | | | | | | | |
| Num | source MAC | f1 | f2 | f3 | f4 | f5 | f6 | f7 | f8 | f9 | f10 | f11 | f12 | | |
| 1 | DAA119325692 | 14328089 | 3289962 | 33819414 | 202512420 | 810049644 | 0 | 0 | 0 | 0 | 0 | 0 | 0 | Footprint 1 | Footprint 1 |
| 2 | E626FE1C0c16 | 15083262 | 1616566 | 33819414 | 758493/3 | 810049644 | 0 | 40103505 | 42781900 | 0 | 0 | 0 | 0 | Footprint 2 | Footprint 2 |
| 3 | DAA119325692 | 14328089 | 3289962 | 33819414 | 202512420 | 810049644 | 0 | 0 | 0 | 0 | 0 | 0 | 0 | Footprint 1 | Footprint 1 |
| 4 | DAA119325692 | 14328089 | 3289962 | 33819414 | 202512420 | 810049644 | 0 | 0 | 0 | 0 | 0 | 0 | 0 | Footprint 1 | Footprint 1 |
| 5 | DAA11956F958 | 14328089 | 5699926 | 33819414 | 0 | 202512420 | 954098543 | 750045375 | 0 | 67111426 | 209711584 | 48264631 | 14734313 | Footprint 3 | Footprint 3 |
| 6 | DAA11976FC3B | 15083262 | 7797610 | 33819414 | 202512420 | 810049644 | 0 | 0 | 0 | 0 | 0 | 0 | 0 | Footprint 1 | Footprint 1 |
| 7 | DAA119DC6A0E | 14328089 | 4444670 | 33819414 | 202512420 | 202512420 | 954098543 | 750045375 | 0 | 67111426 | 209711584 | 48264631 | 14734313 | Footprint 3 | Footprint 3 |
| 8 | DAA1198F9CAA | 14328089 | 9411754 | 33819414 | 202512420 | 810049644 | 0 | 0 | 0 | 0 | 0 | 0 | 0 | Footprint 1 | Footprint 1 |
| 9 | DAA11945B0AD | 14328089 | 4567213 | 33819414 | 202512420 | 810049644 | 0 | 0 | 0 | 0 | 0 | 0 | 0 | Footprint 1 | Footprint 1 |
| 10 | DAA11945B0AD | 14328089 | 4567213 | 33819414 | 202512420 | 810049644 | 0 | 0 | 722654 | 0 | 0 | 0 | 0 | Footprint 4 | Footprint 1 |
| 11 | DAA1198F9CAA | 14328089 | 9411754 | 33819414 | 202512420 | 810049644 | 0 | 0 | 722654 | 4857293 | 0 | 0 | 0 | Footprint 5 | Footprint 1 |
| 12 | E626FE1C0c16 | 15083262 | 1616566 | 33819414 | 758493/3 | 810049644 | 0 | 40103505 | 42781900 | 0 | 0 | 0 | 0 | Footprint 2 | Footprint 2 |
| 13 | DAA11940FF49 | 14328089 | 4259657 | 33819414 | 202512420 | 810049644 | 0 | 0 | 0 | 0 | 0 | 0 | 0 | Footprint 1 | Footprint 1 |
| 14 | DAA11956F958 | 14328089 | 5699926 | 33819414 | 0 | 202512420 | 954098543 | 750045375 | 0 | 67111426 | 209711584 | 48264631 | 14734313 | Footprint 3 | Footprint 3 |
| 15 | DAA119DC6A0E | 14328089 | 4444670 | 33819414 | 0 | 202512420 | 954098543 | 750045375 | 0 | 67111426 | 209711584 | 48264631 | 14734313 | Footprint 3 | Footprint 3 |
| 16 | DAA11953E155F | 14328089 | 8755478 | 33819414 | 202512420 | 810049644 | 0 | 0 | 0 | 0 | 0 | 0 | 0 | Footprint 1 | Footprint 1 |

Fig. 9

|  | CLASSIFICATION | POST-PROCESSING | |
|---|---|---|---|
| Frame number | Footprint assignment | sequence number | SSID |
| 1 | Footprint 1 | 35 | - |
| 2 | Footprint 2 | 1533 | test_net |
| 3 | Footprint 1 | 37 | my_home |
| 4 | Footprint 1 | 40 | my_office |
| 5 | Footprint 3 | 759 | - |
| 6 | Footprint 1 | 2505 | - |
| 7 | Footprint 3 | 764 | - |
| 8 | Footprint 1 | 42 | - |
| 9 |  | 2508 | room_wifi |
| 10 | Footprint 1 | 2509 | work_wifi |
| 11 | Footprint 1 | 43 | my_home |
| 12 | Footprint 2 | 1539 | - |
| 13 | Footprint 1 | 47 | my_office |
| 14 | Footprint 3 | 771 | - |
| 15 | Footprint 3 | 772 | - |
| 16 | Footprint 1 | 2515 | - |

Fig. 10

| Frame number | CLASSIFICATION Footprint assignment | POST-PROCESSING sequence number | SSID | Cluster | FINAL USER |
|---|---|---|---|---|---|
| 1 | Footprint 1 | 35 | - | Cluster 1 | User 1 |
| 2 | Footprint 2 | 1533 | test_net | Cluster 2 | User 2 |
| 3 | Footprint 1 | 37 | my_home | Cluster 1 | User 1 |
| 4 | Footprint 1 | 40 | my_office | Cluster 1 | User 1 |
| 5 | Footprint 3 | 759 | - | Cluster 3 | User 3 |
| 6 | Footprint 1 | 2505 | - | Cluster 4 | User 4 |
| 7 | Footprint 3 | 764 | - | Cluster 3 | User 3 |
| 8 | Footprint 1 | 42 | - | Cluster 1 | User 1 |
| 9 | Footprint 1 | 2508 | room_wifi | Cluster 4 | User 4 |
| 10 | Footprint 1 | 2509 | work_wifi | Cluster 4 | User 4 |
| 11 | Footprint 1 | 43 | my_home | Cluster 1 | User 1 |
| 12 | Footprint 2 | 1539 | - | Cluster 2 | User 2 |
| 13 | Footprint 1 | 47 | my_office | Cluster 1 | User 1 |
| 14 | Footprint 3 | 771 | - | Cluster 3 | User 3 |
| 15 | Footprint 3 | 772 | - | Cluster 3 | User 3 |
| 16 | Footprint 1 | 2515 | - | Cluster 4 | User 4 |

Fig. 18

| FINAL USER | source MAC addresses shown | PRE-PROCESSING 402 feature extraction Footprint | | | | | | | | | | | CLASSIFICATION 404 | | POST-PROCESSING 406 | | |
|---|---|---|---|---|---|---|---|---|---|---|---|---|---|---|---|---|---|
| | | f1 | f2 | f3 | f4 | f5 | f6 | f7 | f8 | f9 | f10 | f11 | f12 | Footprints shown | reduced Footprints | Cluster | sequence numbers | SSID pool |
| User 1 | DAA119325692 | | 2298962 | | | | | | | | | | | Footprint 1 | Footprint 1 | Cluster 1 | 35-47 | my_home, my_office |
| | DAA1198F9CAA | 14328089 | 9411754 | 33819414 | 202512420 | 810049644 | 0 | 0 | 0 | 0 | 0 | 0 | 0 | Footprint 5 | | | | |
| | DAA11940FF49 | | 4259657 | | | | | | | | | | | Footprint 4 | | | | |
| User 2 | E626FE1c0616 | 15863262 | 1896566 | 33819414 | 758495373 | 810049644 | 0 | 40803505 | 427861900 | 0 | 0 | 0 | 0 | Footprint 2 | Footprint 2 | Cluster 2 | 1533-1539 | test.net |
| User 3 | DAA1195b7958 | | 5699928 | | | | | | 722654 | 4857293 | | | | | | | | |
| | DAA11906A0E | 14328089 | 14445070 | 33819414 | 0 | 202512420 | 95405943 | 75045375 | 722654 | 0 | 20971584 | 4826463 | 14734313 | Footprint 3 | Footprint 3 | Cluster 3 | 759-764 | - |
| User 4 | DAA11976FC3B | | 7797819 | | | | | | | 67111426 | | | | Footprint 1 | Footprint 1 | Cluster 4 | 2505-2515 | room_wifi, work_wifi |
| | DAA11953E15F | 14328089 | 87954782 | 33819414 | 202512420 | 810049644 | 0 | 0 | 0 | 0 | 0 | 0 | 0 | | | | | |
| | DAA11945B0AD | | 4567313 | | | | | | 722654 | | | | | Footprint 4 | | | | |

Fig. 19

DEVICE AND METHOD FOR THE UNAMBIGUOUS IDENTIFICATION OF WI-FI DEVICES

CROSS REFERENCE TO RELATED APPLICATION

This application is a 371 of PCT/EP2019/087055, filed Dec. 27, 2019, which claims the benefit of Spanish Patent Application No. P20193104 7 filed Nov. 27, 2019, each of which are incorporated herein by reference.

FIELD OF THE INVENTION

The present disclosure relates to wireless communication systems, and more particularly to methods and systems for identifying Wi-Fi devices when they are not connected to a Wi-Fi network.

BACKGROUND OF THE INVENTION

In wireless networks, different entities from the network communicate by using radio propagation. Examples of wireless communication networks include, but are not limited to, wireless local area networks (WLAN), wireless metropolitan area networks (WMAN), and wireless personal area networks (WPAN). Wireless networks generally present a series of features like the ease to manage mobile devices such as (but not limited to) smartphones, tablets, or laptops; the dependence of the physical media; and the need for an access method to share radio resources such as (but not limited to) transmission power, spectrum allocation, and antenna capabilities.

A Wi-Fi network is a type of WLAN that follows the IEEE 802.11 standard. A Wi-Fi network is the part of the network designed to provide communication between the user devices and the core network, using one or more access points. The core of the network is the part of a communications network that provides services to the client stations connected through the access network. For the sake of simplicity, in the following, and without loss of generality, an entity that provides wireless access to a plurality of user devices is known as an access point (AP), whereas a user device or terminal is called a client station (STA), such as desktop and laptop computers, mobile phones, smartphones, tablets, wireless sensors, as well as any other device provided with a Wi-Fi interface. It is to be understood that the problem addressed within this disclosure is common to any wireless network, and hence the methods, systems, and apparatus disclosed herein may be applied with modifications to any wireless network technology.

With respect to the identification of client stations or devices with Wi-Fi capabilities (i.e. Wi-Fi devices) when they are not connected to any access point (i.e. unconnected or non-connected Wi-Fi devices), the background of the state of the art involves the use of mechanisms external to Wi-Fi or private mechanisms for probing the target device, such as (but not limited to) Bluetooth, Zigbee, as well as proprietary protocols.

Currently, an increasing number of Wi-Fi chipsets include MAC address randomization to prevent the use of the information contained in probe request frames to track the user of the Wi-Fi device. In Wi-Fi networks, the state of the art related to the identification of non-connected Wi-Fi devices focuses on identifying devices whose frames have fixed and non-randomized fields, but do not deal with the problem of non-connected Wi-Fi devices whose frames have variable fields, usually the MAC address (i.e. MAC address randomization). From the profiling point of view, the state of the art focuses on the taxonomy of devices already connected to a Wi-Fi network, ignoring the interesting case of non-connected Wi-Fi devices. The present invention solves the problem of unambiguously identifying Wi-Fi devices when they are not connected to a Wi-Fi network and employ MAC address randomization.

DESCRIPTION OF THE INVENTION

The present invention relates to wireless communications, and specifically to a device, a method and a computer program product for identifying Wi-Fi devices. The information-gathering process proposed herein may be used within a plurality of wireless devices such as (but not limited to), access points, wireless stations, wireless sensors, and wireless routers.

The present invention allows the unambiguous identification of a wireless device with Wi-Fi capabilities (W-Fi device) by another wireless device with Wi-Fi capabilities when the two devices are not connected to each other. The proposed method is based on the extraction of distinctive fields from received probe request frames, as well as their projection in the hyperspace of features and their subsequent classification to degenerate into univocal footprints, signatures or profiles. The method unambiguously identifies a Wi-Fi device even when it transmits a random (or fake) MAC address and even if they show different fields in each frame. The method identifies Wi-Fi devices even if they move or leave and enter the analysis area over time. The collected data can be stored in a database to keep an identifying record of unconnected client stations in the vicinity of a Wi-Fi network. The present invention can be applied independently of the core network used, and also for any type of service provided by the network.

According to some aspects of the present invention, the set of access points that compose the access network can be distributed along the coverage area. With respect to other aspects of the present invention, a set of access points can be connected to each other through a backbone network, with the objective of allowing communication between them. In this sense, different means of transmission can be used, for example (and without loss of generality), optical fiber, radio waves, infrared links, coaxial cable, and shielded/unshielded pair cables.

Given a Wi-Fi network with one or more access points (which may or may not have client stations connected) and several client stations not connected to any of them, the present invention is based on generating an unambiguous footprint, signature or profile of the unconnected client stations despite the fact that they modify one or more fields of the probe request frames they transmit.

The present invention identifies one or more user devices in the vicinity of a Wi-Fi access point or router (supported by the IEEE 802.11) but not connected to it, although connected Wi-Fi devices can also be identified provided they also transmit probe request frames. The invention monitors the frames sent by Wi-Fi devices when they are not connected to the wireless network and builds an anonymous footprint or signature of the device. This footprint or signature corresponds univocally with a client station, regardless of whether they send or not noticeably different fields in each frame, such as (without loss of generality) device physical or logical features, source MAC addresses, among many others. In this way, the identifier of that device is no longer the MAC address of the device's radio interface;

instead, the new footprint or signature can be associated (without loss of generality) with physical, logical and contextual parameters of the device. The footprint or signature is built by projecting the frame in a feature space designed to maximize the variance between different devices, and classifying the points so that those ones from the same device belong to the same class. After that, a machine-learning-based post-processing step reduces classification errors. All the gathered information can be stored in a database for further processing and analysis.

The applications of the present invention are multiple since it is a transversal technology that can be easily applied in a wide range of scenarios. To begin with, a system capable of unambiguously identifying non-connected devices is able to track the devices (along with their respective users) in order to store these data for further processing. One of the most common applications could be to real-time locate on a map the Wi-Fi devices on different sites (such as airports, shopping centers, hotels), by using only the Wi-Fi network deployed and without the need to ask users permission to install annoying applications or make changes in their terminal's software.

In addition, aggregated and anonymized data from all users at a particular site can be refined using machine learning techniques to perform:
- Estimates on masses of people from the number of devices sending probe request frames (there will be users without devices, devices that do not send frames, users with multiple devices, etc.).
- Prediction of agglomerations and flow patterns of crowds for security applications.
- User profiling based on the unambiguous footprint of their devices (e.g. type and manufacturer of the smartphone, tablet, etc.).

Finally, once the real users in an environment have been identified, they can be tracked when they visit again the facilities, as well as compare these data with other data available, and exploit them to improve the deployment of the environment (network level, placement of shops, establishments, and restaurants, etc.).

BRIEF DESCRIPTION OF THE DRAWINGS

A series of drawings which aid in better understanding the invention and which are expressly related with an embodiment of the said invention, presented as a non-limiting example thereof, are very briefly described below.

FIG. 6 depicts a table with 16 different probe request frames and the features extracted from them.

FIG. 7 represents the footprint assignment of the probe request frames of FIG. 6.

FIG. 9 depicts the footprint reduction performed after the first footprint assignment.

FIG. 10 shows the sequence number and SSID of the exemplary probe request frames.

FIG. 18 illustrates a table with the identification of users for the probe request frames of FIG. 6.

FIG. 19 shows the description of the users that have been univocally identified in the example of FIG. 6.

DESCRIPTION OF A PREFERRED EMBODIMENT OF THE INVENTION

Figure 1:
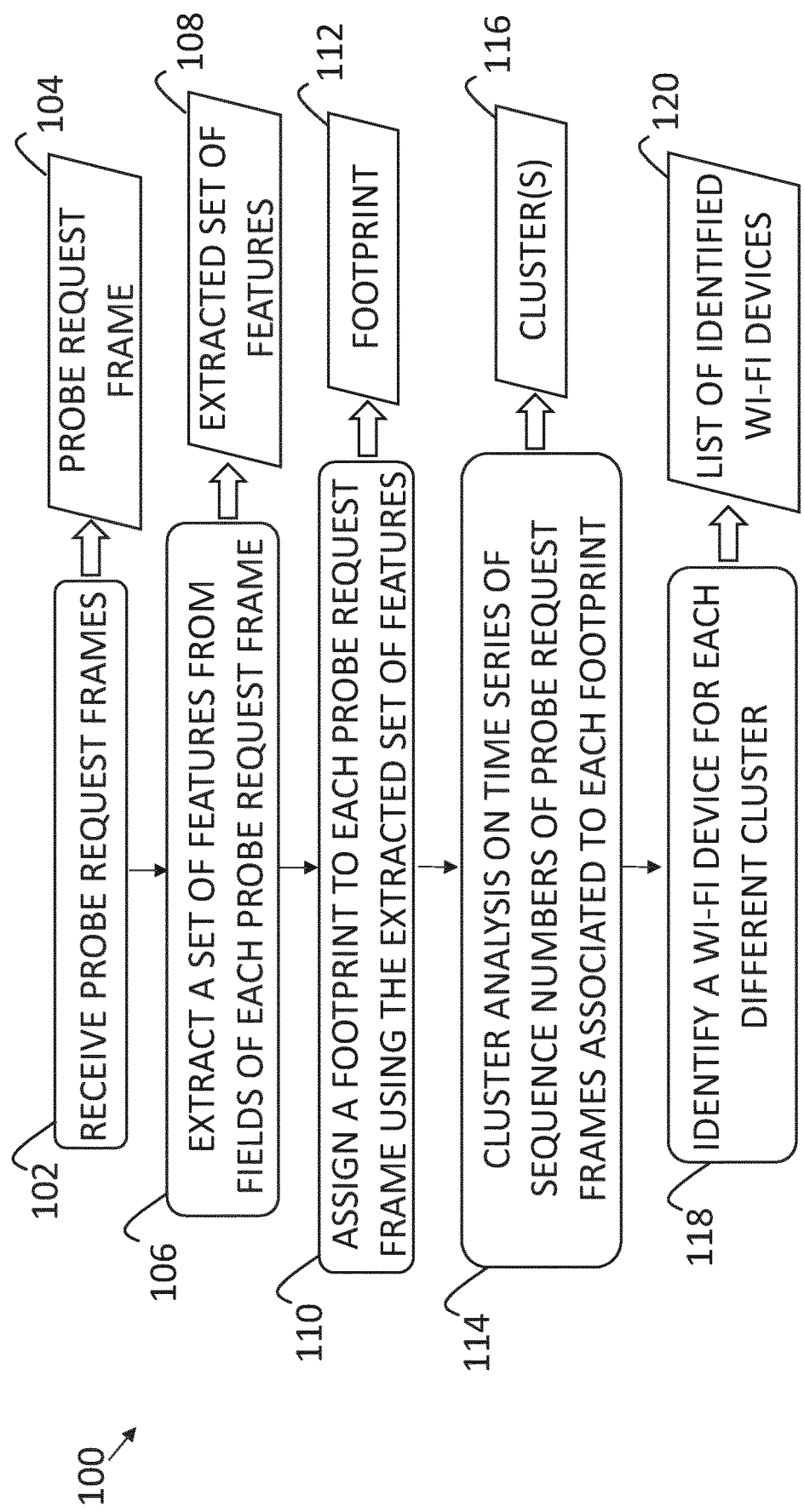
FIG. 1 represents a flow diagram of the method for the unambiguous identification of Wi-Fi devices.

The present invention refers to a method and a device for the unambiguous identification of Wi-Fi devices. FIG. 1 depicts a flow diagram of method 100, which comprises the following steps:

Receiving 102 probe request frames 104 sent by Wi-Fi devices 202.

Extracting 106 a set of features 108 from a plurality of fields of each probe request frame 104.

Assigning 110 a footprint 112 or signature to each probe request frame 104 based on the extracted set of features 108.

For each footprint 112, performing a cluster analysis 114 on a time series of the sequence numbers included in the header of the probe request frames 104 associated with the corresponding footprint 112, so as to obtain at least one cluster 116 for each footprint 112.

Identifying 118 a Wi-Fi device for each different cluster 116.

The method may further comprise storing, on a probe request database, the source MAC address of each probe request frame 104, and/or the extracted set of features 108 of each probe request frame 104, and/or the footprint 112 assigned to each probe request frame 104.

Figure 2:
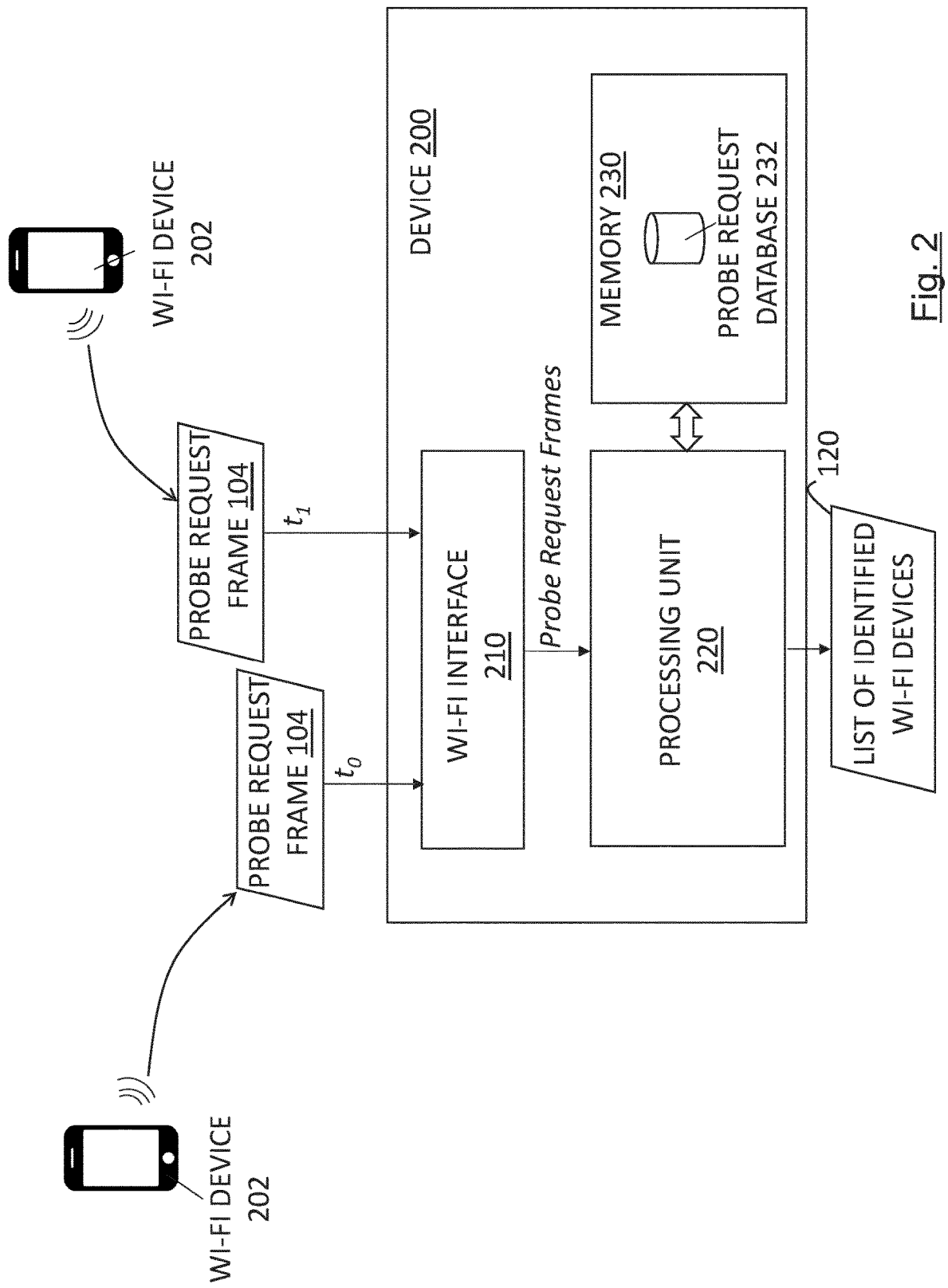
FIG. 2 represents a block diagram of the device for the unambiguous identification of Wi-Fi devices.

FIG. 2 represents a basic diagram of the device 200 used for the identification of Wi-Fi devices 202. In particular, the device 200 comprises a Wi-Fi interface 210, a processing unit 220 and a memory 230. The Wi-Fi interface 210 is an entity within the Wi-Fi module adapted to operate in monitor mode in order to listen to frames wirelessly sent by Wi-Fi devices 202. The processing unit 220 (implemented for instance as a processor) is configured to carry out the steps of method 100. The memory 230 includes a probe request database 232 for storing the extracted set of features 108 and the footprint 112 assigned to each probe request frame 104.

The probe request frame 104 is a special management frame for two main reasons:
- The probe request frame is the only frame that a client station sends when it is not connected to any network (and does not intend to connect immediately). It can also be sent from devices connected to Wi-Fi networks, but less frequently (therefore, the present invention can also be used to identify connected Wi-Fi devices).

Even if a client station is connected to a network (own or external), the probe request frame is the only frame that the client station sends naturally on channels other than the one it is operating.

These particularities make the probe request management framework particularly interesting for unambiguously identifying users and devices not connected to the network. However, it is not enough to check the source MAC address of these frames to identify the device and/or user, because most of the probe request frames come with random (or fake) source MAC addresses. Without loss of generality, these addresses have a different degree of randomness (depending on the manufacturer of the device):

1. Real or non-random source MAC addresses.
2. Random source MAC addresses that change in each probe request frame sent.
3. Random source MAC addresses that change every certain number of probe request frames sent, or every certain amount of time.
4. Random source MAC addresses that change each time the transmitter radio is turned on, but remain fixed once in operation.

Except for the first case, which is becoming more and more obsolete, the rest of the MAC addresses are unreliable when it comes to identifying a device or user, as several probe requests with different source MAC addresses may belong to the same client station. The method of the present invention also checks other fields of the probe request frames, building an unambiguous footprint or signature in order to determine the unambiguous identity of the transmitter device.

Figure 3:
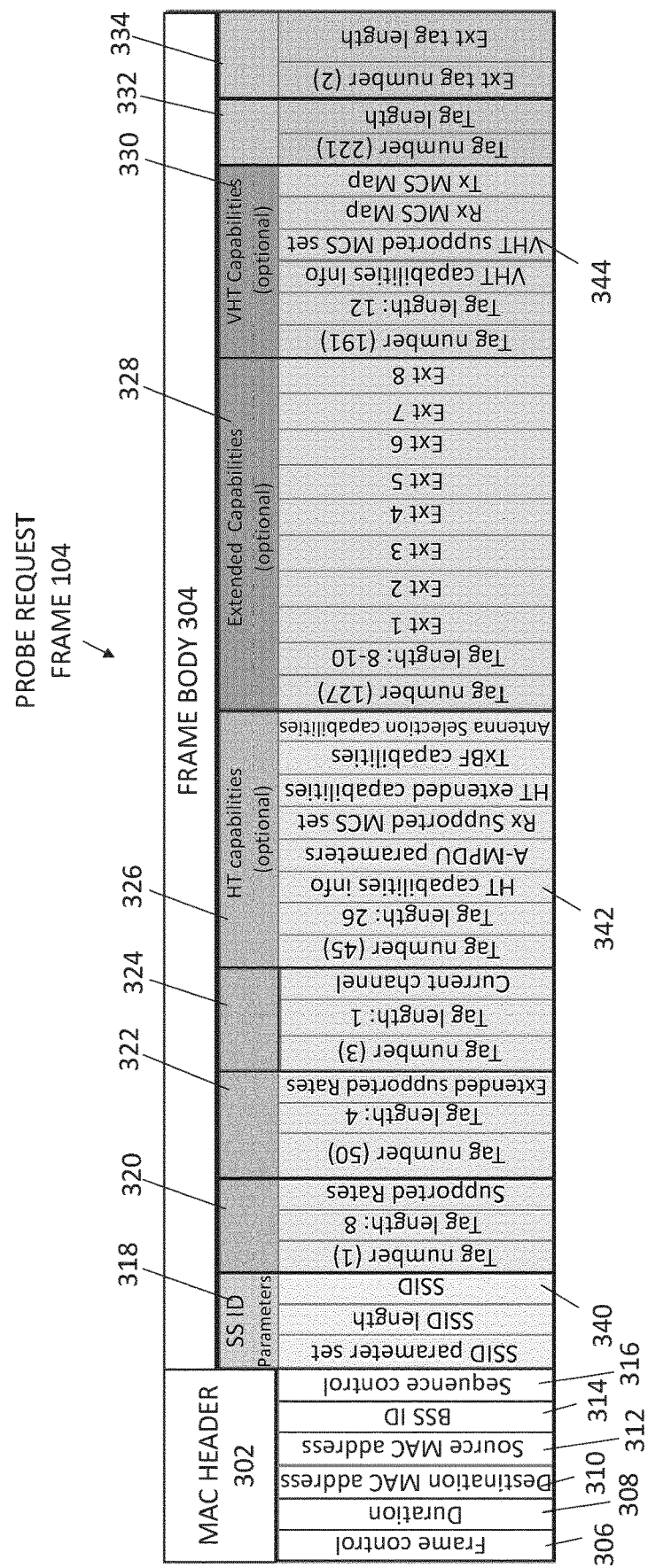
FIG. 3 shows the structure of a probe request frame according to the IEEE 802.11 standard.

The probe request frame 104 has the general structure depicted in FIG. 3. The probe request frame 104 includes a header 302, a frame body 304 and a frame check sequence (FCS, not shown in the figure) used as a redundancy check code. The header 302 and the frame body 304 includes different fields.

In particular, the header 302 includes a frame control field 306, a duration field 308, a destination MAC address field 310, a source MAC address field 312, a BSSID field 314 and a sequence control field 316.

Likewise, the frame body 304 includes an SSID parameters field 318, a supported rates field 320, an extended supported rates field 322, a DC parameter set field 324, an HT capabilities field 326, an extended capabilities field 328, a VHT capabilities field 330, a vendor-specific field 332 and a FILS request parameters field 334. Most of the fields after the supported rates field 320 are optional. The fields of the frame body 304 comprise in turn several other fields (or sub-fields). For instance, the SSID field 340, the HT capabilities info field 342 or the VHT supported MCS set field 344.

The present invention uses the fields within the probe request structure to build a logical footprint of the device announced capabilities. For that purpose, it is required to select a good set of features to build a suitable feature space as a pre-processing step for a classifier.

The invention considers two types of fields:
Static fields, also known as features, that will form the footprint for that probe request frame. For example, the supported rates field 320, the HT capabilities field 326 or the VHT capabilities field 330. These fields are used in the classification process.
Dynamic fields, which change intensively over different frames belonging to the same user. For example, the sequence control field 316 or the SSID field 340. These fields are mandatory in the 802.11 standards and will be used in a post-processing step.

The two outcomes of an identification process using the probe request frames may be:
A positive identification, when two or more probe request frames 104 with different source MAC addresses are identified as the same user (i.e. Wi-Fi device 202).
A negative identification, when two or more probe request frames 104 with different source MAC addresses are identified as different users.

Thus, the proposed identification may fail in the following ways:
With a false positive, when the system identifies two or more probe request frames 104 with different source MAC addresses as the same user, but they actually belong to different users.
With a false negative, when the system identifies two or more probe request frames 104 with different source MAC addresses as different users, but they actually belong to the same user.

Figure 4:
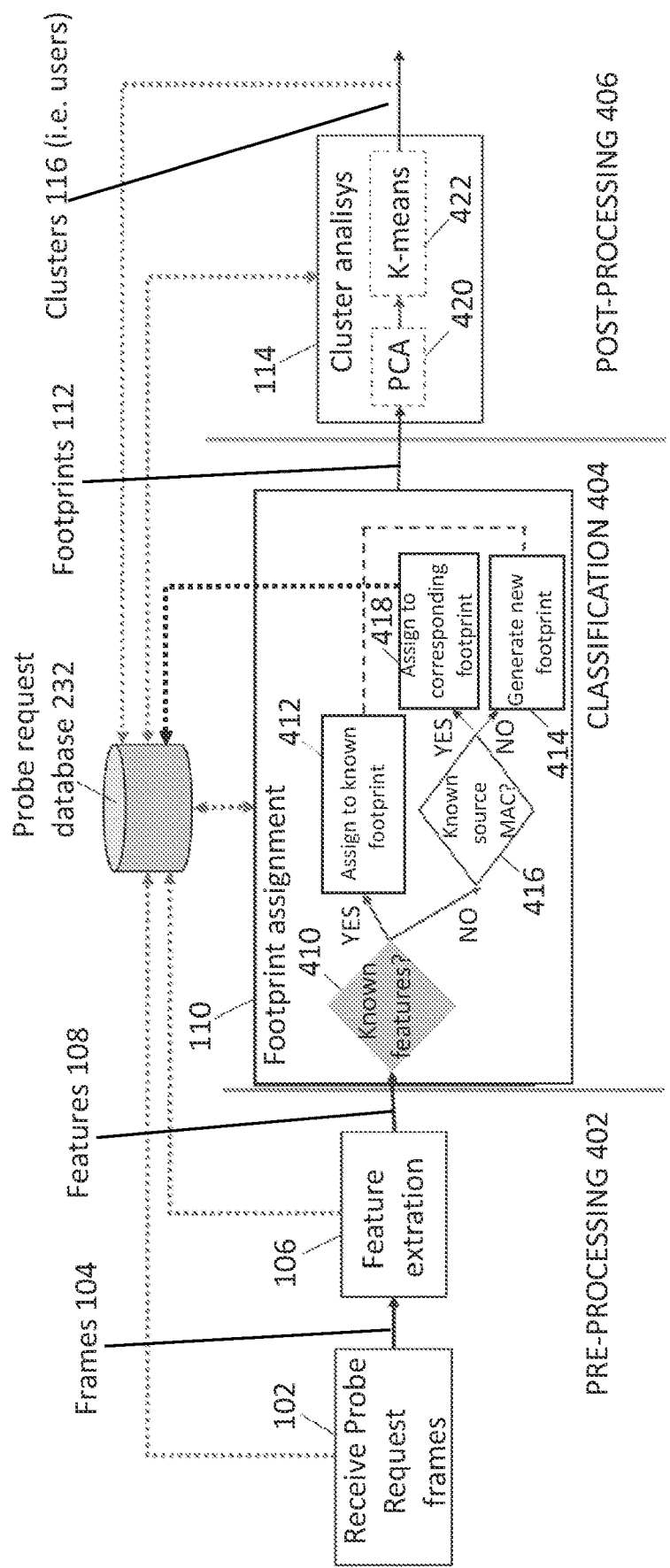
FIG. 4 shows the different steps performed by the method, according to an embodiment.

FIG. 4 shows a detailed block diagram of the different steps performed by the method. The main blocks are:
The reception 102 of probe request frames 104.
The feature extraction 106 from the probe request static fields.
The footprint assignment 110 (or signature assignment) depending on whether the features are known or not. A new footprint or signature is generated 414, or a known footprint or signature is assigned 412, based on the extracted features 108.
The cluster analysis 114. It is a sequence analysis based on machine learning unsupervised techniques that take into account the sequence numbers of the frames and, optionally, the coherence of the SSIDs announced by some frames. According to the embodiment depicted in FIG. 4, the cluster analysis 114 comprises a principal component analysis 420 and a a k-means clustering analysis 422.

The first two blocks (102, 106) correspond to a pre-processing step 120 by which the probe request frames 104 are projected onto a feature space, thereby obtaining a set of features 108. The footprint assignment 110 may be considered as a classification step 404 for obtaining different footprints 112 (or classes) with the aim to identify different users and reduce false negatives. The cluster analysis 114 may be regarded as a post-processing step 406 of the footprints 112 in order to separate users that apparently have the same footprint 112 and reduce false positives.

The reception 102 of probe request frames 104 may be performed by a Wi-Fi interface in monitor mode, which can listen to surrounding frames, even if their destination is not that interface (or even if they do not have a specific destination). The received probe request frames 104 may be processed by the listener entity.

The probe request database 232 is built, updated, and purged dynamically while new probe request frames are received, classified, and post-processed. The probe request database 232 may be used to store all of the received probe requests frames 104, together with their corresponding static fields (footprint features 108) and dynamic fields (sequence number, SSID). The probe request database 232 also stores the assigned footprint 112, the estimated user or Wi-Fi device for that frame (corresponding to the cluster 116), as well as any other parameter needed by the system. While analyzing a set of received frames, there will normally be many more frames than users.

Regarding the feature extraction 106, a set of features will be extracted from certain fields of the probe request frames 104. Without loss of generality, the proposed feature space comprises the following features:

Feature 1: Bytes 1-3 of the source MAC address field 312. This part corresponds to the device manufacturer.

Feature 2: Bytes 4-6 of the source MAC address field 312. This part is randomized in some frames, and therefore it will not be part of the footprint (although it is interesting to store it for some processes).

Feature 3: Bytes 1-4 of the supported rates field 320. This field is mandatory in a probe request.

Feature 4: Bytes 5-8 of the supported rates field 320.

Feature 5: Bytes 1-4 of the extended supported rates field 322.

Feature 6: Bytes 5-8 of the extended supported rates field 322.

Feature 7: Bytes 1-4 of the HT capabilities field 326.

Feature 8: Bytes 5-8 of the HT capabilities field 326.

Feature 9: Bytes 1-4 of the extended capabilities field 328.

Feature 10: Bytes 5-8 of the extended capabilities field 328.

Feature 11: Bytes 1-6 of the VHT capabilities field 330.

Feature 12: Bytes 7-12 of the VHT capabilities field 330.

Different combinations of features may be considered for the footprint. According to a preferred embodiment, feature 1 and feature 3 are mandatory for the footprint. The rest of the fields may be added to the footprint if they exist (if not, they can be included with value zero in the footprint). The above selection of features is only one of many possible, and in other implementations, other features may be chosen. The features can be stored in hexadecimal, binary, or decimal formats. For illustration purposes, the examples shown in the figures are in decimal format.

The invention addresses the problem of building an unambiguous footprint for non-connected devices with a random source MAC address. For devices using MAC randomization, the source MAC address is no longer a reliable field for unambiguously identifying a device. In the proposed feature selection, feature 2 may change between different probe request frames transmitted by the same device, and therefore it is necessary to check other features (for instance, the other 11 features or a combination thereof) when building a unique footprint of that device.

In the end, a Wi-Fi device 202 not connected to the wireless network is no longer identified by its source MAC address, but by a feature vector (f=[f1, f3, . . . , f12]) used for the footprint assignment in the classification step 404 and also considering other variable parameters in the post-processing step 406.

Figure 5:
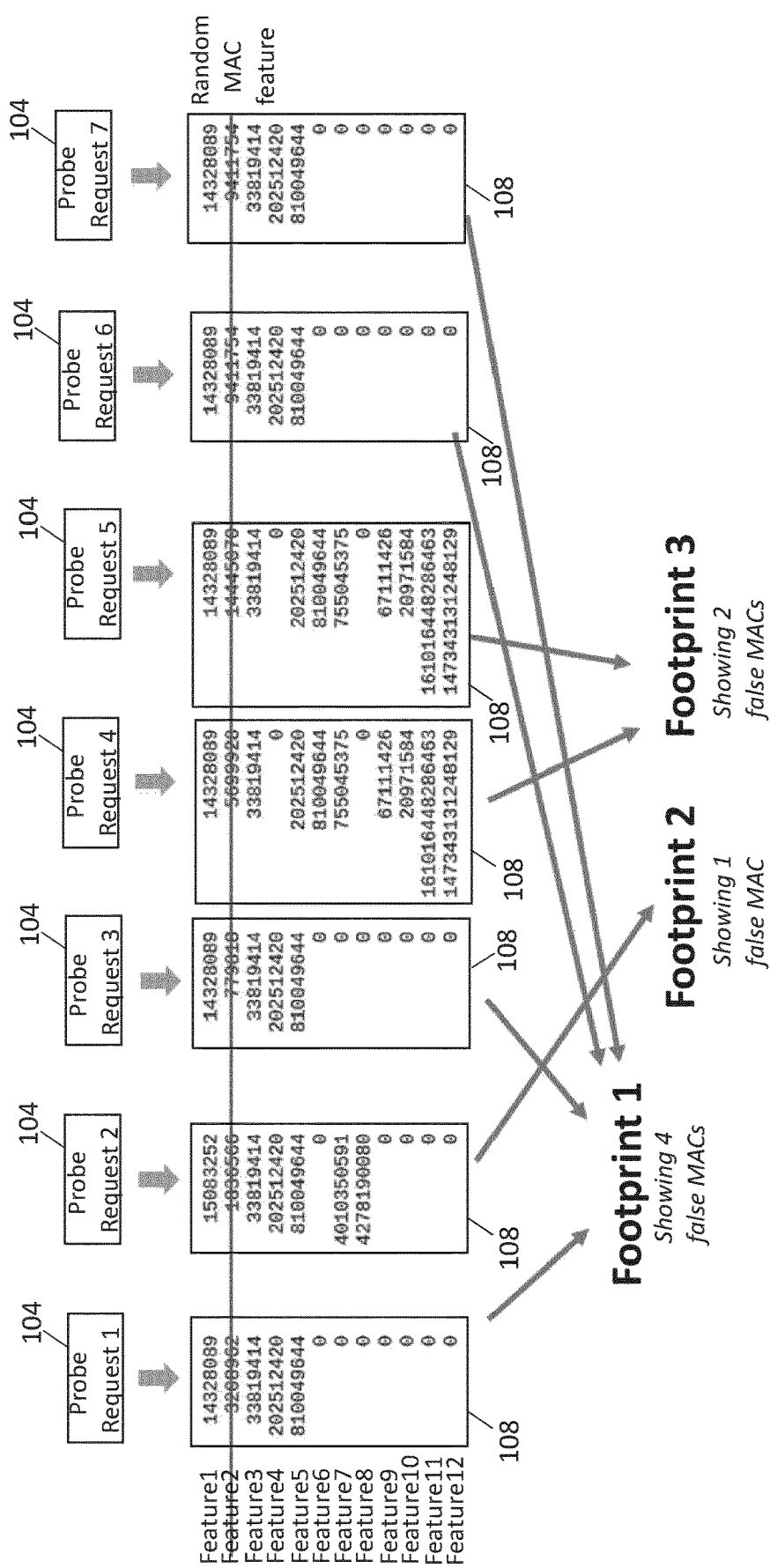
FIG. 5 shows examples of features extracted from probe request frames.

Some examples of sets of features 108 ([f1, f2, f3, . . . , f12]) extracted from probe request frames 104 sent by Wi-Fi devices 202 are depicted in FIG. 5. In the embodiment shown in FIG. 5, the footprints are formed by feature vector f=[f1, f3, . . . , f12] comprising all the extracted features except for feature 2, since this feature may correspond to a random MAC address.

The footprint by itself will identify univocally most of the users, properly assigning several probe request frames with different source MAC addresses (but same footprint) to the right user. FIG. 6 illustrates an example of 16 received probe request frames 104 and the extracted features 108. By deleting extracted feature 2, as depicted in the exemplary table of FIG. 6, a footprint may be obtained for each probe request frame.

Once the feature extraction 106 is complete, a footprint 112 is assigned 110 to each probe request frame 104 based on the extracted set of features 108. As depicted in the embodiment of FIG. 4, it is first checked 410 whether the extracted features that form the footprint are already known or not (in this checking at least feature 2 is not taken into account). If the received footprint is known, that probe request frame 104 is assigned 412 to that footprint, since the frame will probably correspond to a known user. If the received footprint is unknown, a new footprint is generated 414 with the features corresponding to that probe request frame, since in this case, the frame will probably correspond to a new user.

FIG. 7 depicts the footprint assignment 110 in the classification step 404 performed on the probe request frames of FIG. 6. Whenever an unknown set of features is detected, a new footprint (footprint 2, footprint 3, footprint 4, footprint 5) is assigned. In this example, a new footprint is generated and assigned to probe request frame number 10 ("footprint 4") since, although it is almost identical to footprint 1, there is no match in feature 8. Similarly, probe request frame number 11 is assigned a new footprint ("footprint 5"), since there is no match in feature 9 with any previous footprint.

Figure 8:
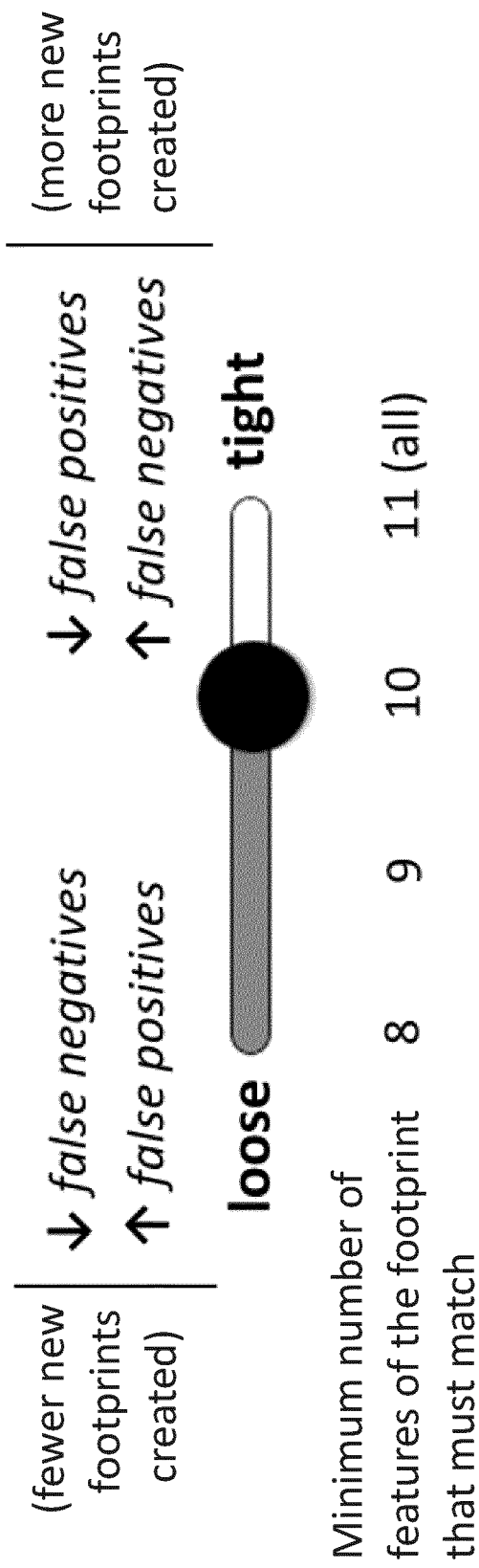
FIG. 8 illustrates the different feature matching (between a loose mode and a tight mode) that may be considered for the footprint assignment.

The system can select how restrictive is regarding the footprint assignment, depending on how many features a new frame must match in order to be assigned to the corresponding footprint. This selection may be useful because sometimes the same device can display some small differences in extracted features 3-12. FIG. 8 represents an embodiment with four possible different restriction modes, from "loose" to "tight". According to this embodiment, the footprint assignment is performed such that the footprint assigned to two different probe request frames is the same when there is a match on at least a determined number of features within the extracted set of features of both probe request frames.

In loose mode, at least 8 features of the extracted set of features must match to consider that they share the same footprint. In tight mode, all the 11 extracted features considered for the footprint (features 1 and 3-12) must match. The threshold (i.e. the minimum number of features) may also be set to 9 or 10, in between restriction modes "loose" and "tight". When receiving a new probe request frame, if the number of features matching with an already known set of features from previous frames does not reach the determined threshold, a new footprint is assigned to that probe request frame.

When the restriction mode is not the "tight" mode (i.e., less than 11 features must match for the assignment), the selected footprint will be the one with more features in common with the new frame. The fact of increasing false-negative rates or false-positive rates is not critical at this point, as the system has additional blocks that help to reduce these rates. Without loss of generality, it is not recommended to consider matching fewer than 8 features for the footprint assignment. In the examples depicted in all figures, the footprint assignment is set to tight (i.e., full matching of all 11 features).

This way, the step of assigning a footprint may comprise checking 410, for each probe request frame received, if at least a determined number of features (e.g. at least 8 when working in "loose" restriction mode) within the extracted set of features 108 of the received probe request frame 104 matches corresponding features associated with any footprint 112 previously stored on the probe request database 232. If that is the case, the matching stored footprint is assigned 412 to the received probe request frame 104. If there is more than one matching footprint, the closer footprint is preferably selected (i.e. the one with the highest number of matching features). Otherwise, a new footprint associated with the extracted set of features 108 of the received probe request frame 104 is generated 414 and stored on the probe request database 232.

Although in the previous examples the footprint associated with a probe request frame directly corresponds to a subset of the extracted features (e.g., feature vector f=[f1, f3, . . . , f12]), in other embodiments the footprint may be any kind of data generated from a combination of extracted features (e.g. applying a function to a subset of extracted features) or associated with said combination of extracted features (e.g., "footprint 1" for a first footprint associated with a particular subset of extracted features stored on the probe request database 232).

In the classification step 404, the number of footprints may be optionally reduced by checking 416 that no additional footprints are created for the same Wi-Fi device 202. In order to prevent the creation of spurious footprints (false negatives), for each probe request frame 104 received it is checked in step 416 whether the complete source MAC address field 312 (i.e., combined features 1-2) of the received probe request frame 104 matches the source MAC address field 312 of any probe request frame previously stored on the probe request database 232. If there is a match in the source MAC address field 312, the footprint associated with the matching stored probe request frame is assigned 418 to the received probe request frame 104, avoiding the creation of a new spurious footprint.

The checking performed in step 416 to reduce the number of footprints (with the aim to minimize the number of false negatives) may be applied just after the checking in step 410, as depicted in the embodiment of FIG. 4. In another embodiment, the checking in step 416 and the assignment in step 418 are not performed (i.e., only steps 410, 412 and 414 are considered).

In another embodiment, the checking in step 416 is performed just after the first footprint assignment in steps 412 and 414. FIG. 9 illustrates the footprint reduction performed in steps 416 and 418 after the first footprint assignment in steps 412 and 414. In this example, the source MAC address field 312 ("DAA11945B0AD") of the first instance of footprint 4 (i.e. probe request frame number 10) is already stored in the probe request database 232 (the source MAC address field of probe request frame number 9); therefore, footprint 4 is reassigned to footprint 1. When probe request frame number 13 (corresponding to the second instance of footprint 4 in FIG. 7) is received, it is directly assigned footprint 1 instead of footprint 4, since all the extracted features correspond to probe request frame number 10 and this frame is now assigned to footprint 1. The same occurs with footprint 5 since the associated source MAC address field 312 ("DAA1198F9CAA") of the probe request frame number 11 is also stored in the probe request database 232 (probe request frame number 8) as footprint 1. Therefore, in this example, the number of footprints is reduced from 5 to 3.

Alternatively, step 416 may be performed before or at the same time as steps 412 and 414. In the embodiment of FIG. 4, step 416 is performed after a negative checking in step 410, just before the generation 414 of a new footprint. If in step 416 there is a match in the source MAC address field, the generation 414 of a new footprint is then avoided.

Once the footprints 112 have been assigned, a cluster analysis is performed to reduce the false positive rate by analyzing other fields of the probe request frames. These new fields are dynamic fields, and for that reason, they do not form part of the footprint (static fields). However, they are extremely useful for unambiguous identification because they exhibit some interesting patterns that can be exploited by the system.

The dynamic fields at least include the sequence number marked in the header 302 of the probe request frame 104 (in particular, included in the sequence control field 316). The type of the sequence control field 316 is numeric, with a value ranging from 0 to 4095. As some frames are lost or missed during communication, the sequence numbers for the same user are not strictly consecutive.

The dynamic fields may also include the SSIDs that are targeted by the probe request frame 104. The type of the SSID field 340 is a string of characters; for example, "My home WiFi" or "Office_network_2". A substantial number of probe request frames 104 leave this field empty.

FIG. 10 shows the sequence number 1102 and SSID 1004 announced by the 16 exemplary frames of FIG. 9, together with their footprints assigned in the classification step 404 (once the number of footprints have been reduced).

In this regard, after assigning the footprints, on which false negatives (assignation of probe request frames to various footprints when they actually belong to the same Wi-Fi device) are minimized with respect to the classic MAC-based user identification, a post-processing step 406 is carried out in order to further minimize false positives (incorrectly aggregating various Wi-Fi devices under the same footprint).

The post-processing step 406 addresses the problem of assigning probe request frames 104 from different real users to the same footprint when they exhibit the same footprint (usually when two concurrent users have the same device model). In this case, since the number of Wi-Fi devices may be greater than the number of footprints assigned, it is necessary to separate the time series of frames belonging to one or more potentially different Wi-Fi devices 202.

For that purpose, the dynamic fields (the sequence number and, optionally, the targeted SSIDs) will be used. Without loss of generality, the post-processing of sequence numbers is applied to, at least, a determined number of frames (e.g., at least 6 frames) belonging to the same footprint. A series of fewer than said number of frames are not analyzed.

Figure 11:
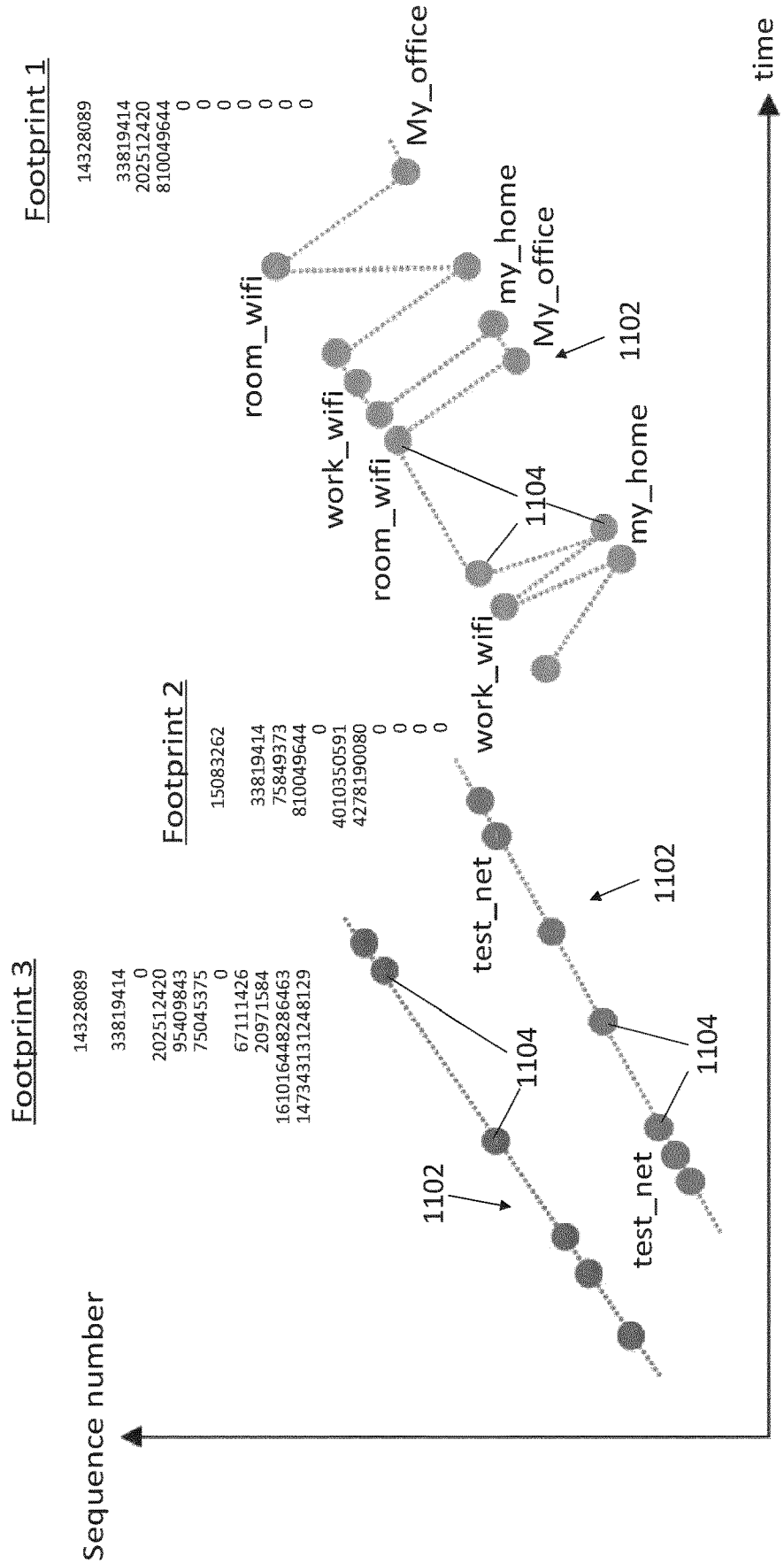
FIG. 11 shows the representation of the three time-series corresponding to three different footprints.

In order to assess if the sequence numbers associated with a footprint belonging to one or more users, a cluster analysis 114 is performed on the time series 1102 of the sequence numbers (samples 1104) of the probe request frames associated with the said footprint. As an example, FIG. 11 depicts the representation of three time series (together with their announced SSIDs) corresponding to three different footprints, wherein the horizontal axis represents the time of reception of the received probe request and the vertical axis represents the value of the sequence number (ranging from 0 to 4095).

Figure 12:
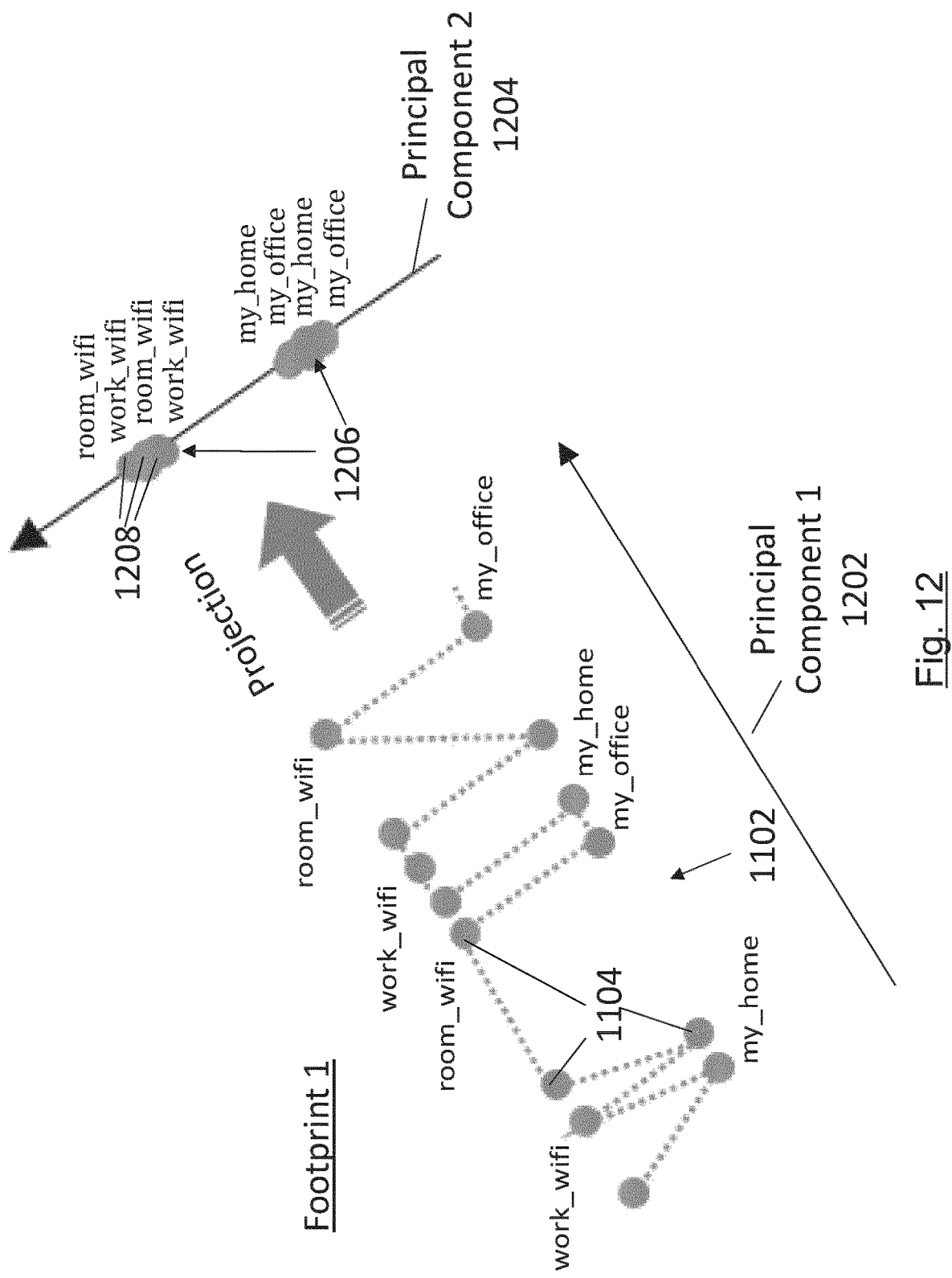
FIG. 12 shows the projection of a time series of FIG. 11 ("Footprint 1") on the second principal component.

Each time series 1102 is then analyzed in the following way:
1. Principal component analysis 420 (PCA in FIG. 4) is performed over the time series 1102 in order to find the axes of maximum variance of the set of samples 1104 (a first principal component 1202 and a second principal component 1204).
2. The samples 1104 are projected over the second principal component 1204, together with their announced SSIDs (if any). FIG. 12 depicts the projection of the time series 1102 corresponding to "Footprint 1" on the second principal component 1204 (or a parallel line thereof).

3. Then, the projected time series 1206 (comprising the projected samples 1208; i.e., the samples 1104 projected over the second principal component 1204) is classified into clusters. In an embodiment, the classification algorithm includes a k-means clustering analysis 422 (an unsupervised classification algorithm), although other classifying algorithms may be used. K-means is performed looking for the minimum number of clusters needed to explain the sample distribution:
   a. If 1 cluster is enough (low aggregated classification error with just 1 class), then the probe request frames correspond to a single user (this will be the most usual case).
   b. If more clusters are needed (high aggregated classification error with just 1 class), then the number of clusters is increased until a stop condition is reached.

Figure 13:
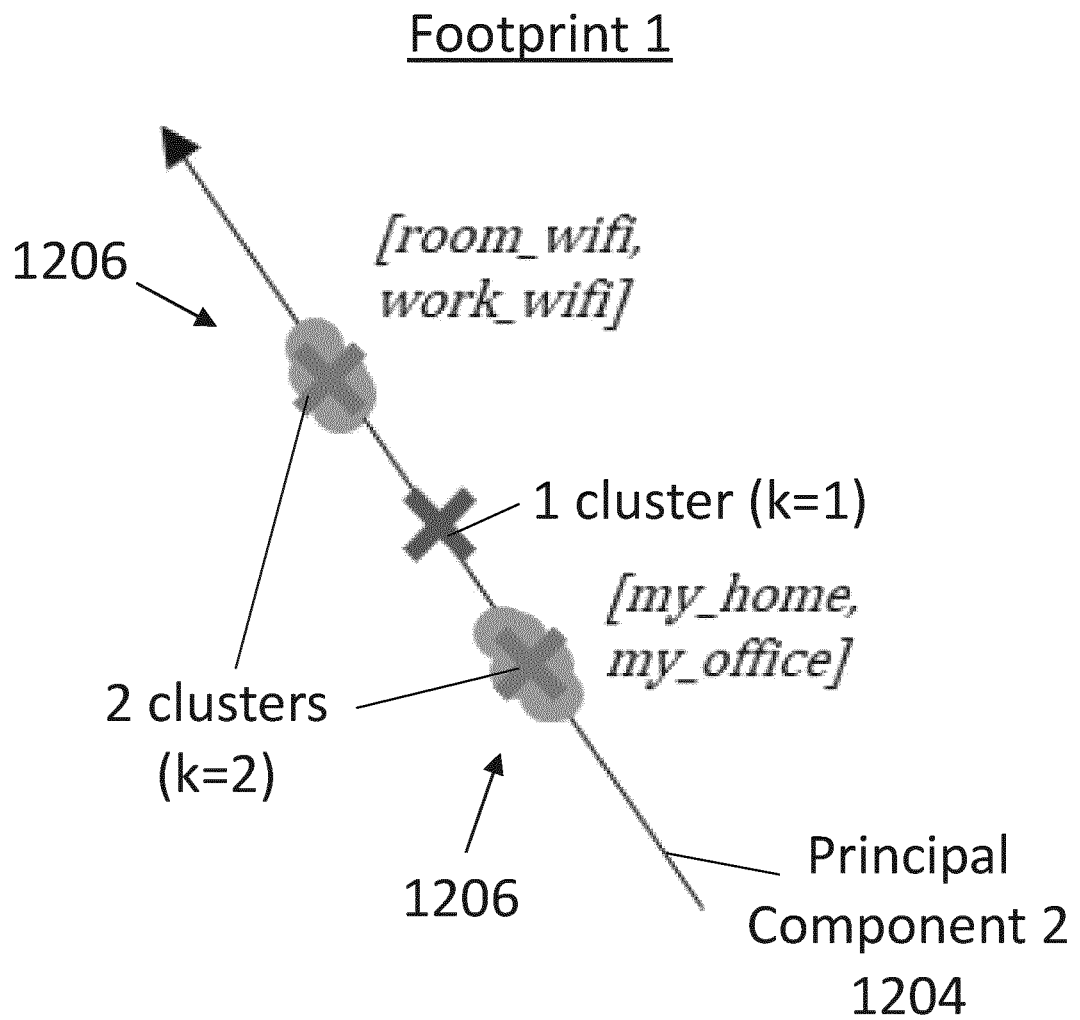
FIG. 13 depicts a cluster analysis performed on the projected time series of FIG. 12.

The k-means clustering analysis 422 starts performing k-means iterations with k=1. If after several iterations the aggregated classification error is greater than a threshold, further k-means iterations with increasing values of k are performed until the aggregated classification error is lower than a threshold. In the example of FIG. 13, which corresponds to a cluster analysis 114 of the projected time series 1206 of FIG. 12, the distribution of the projected samples 1208 cannot be explained with just one cluster (obtained with k=1) since the aggregated classification error is greater than a predetermined threshold. However, for k=2 the distribution can be explained (the aggregated classification error is lower than a threshold), and therefore two clusters are obtained for "Footprint 1" time series 1102.

Figure 14:
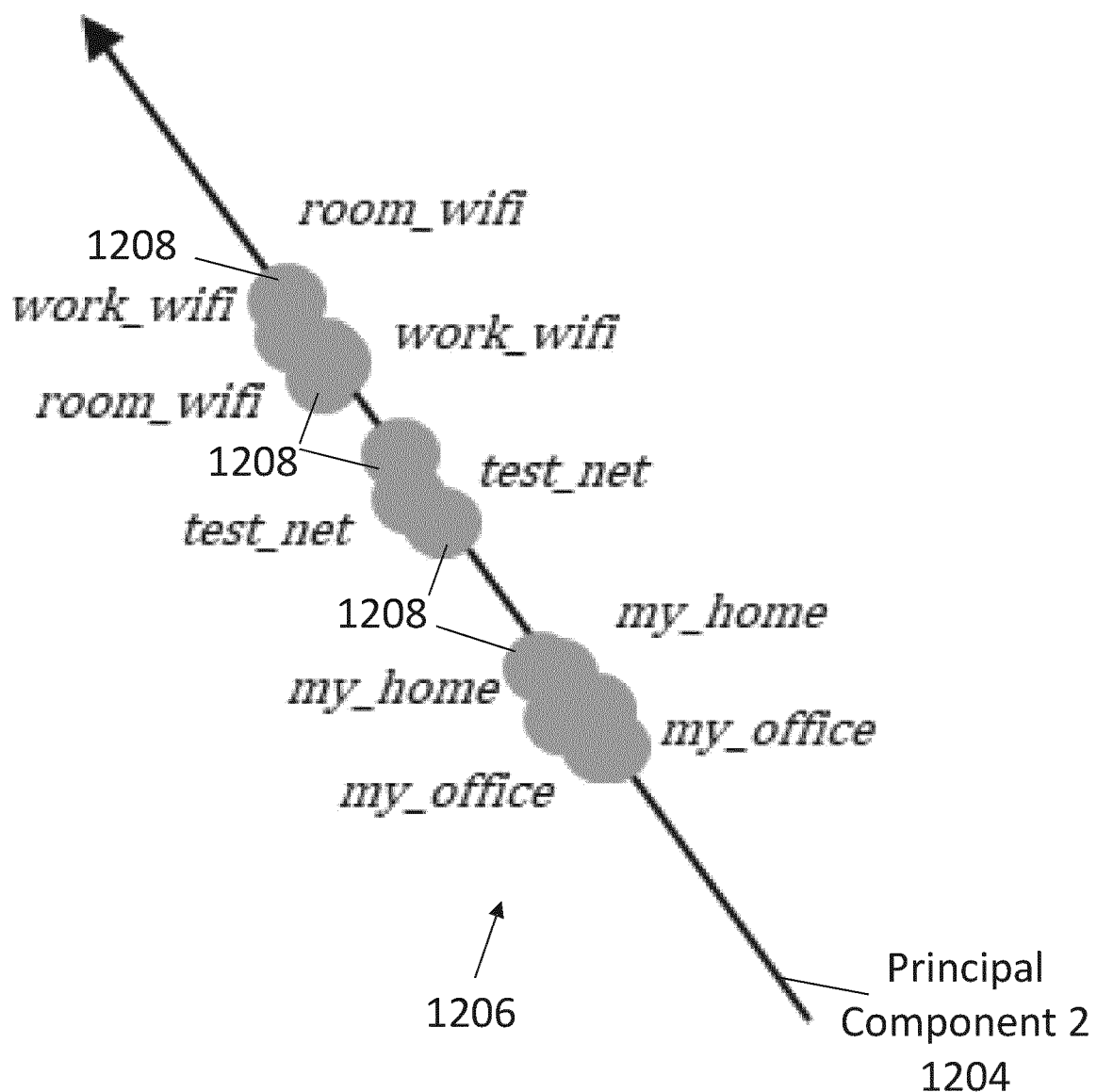
FIG. 14 illustrates a case with projected frames including their associated SSIDs.

There are situations where the sequence numbers are very close even in the principal components space. In this situation, it is not clear if more or fewer clusters are needed. FIG. 14 illustrates one of such cases, with projected frames including their associated SSIDs.

In this case, the SSID pool can be used to help to determine the clusters. The SSID pool is the set of SSIDs which have been announced by a Wi-Fi device 202 within its probe request frames 104 (included in the SSID field 340). Thus, during the k-means iteration, to select the appropriate number of clusters (i.e. users or Wi-Fi devices) within the same class:
   If the SSID pool of two or more clusters shows that the percentage of repeated SSIDs is above a given SSID redundancy threshold, it is highly probable that all these clusters belong to the same user or Wi-Fi device (same device capabilities, similar sequence numbers, and same known Wi-Fi networks). These clusters are merged into one cluster, reducing the number of users, and thus reducing false negatives. The k-means clustering analysis 422 stops.
   However, if the SSID pool of two or more clusters shows that the percentage of repeated SSI Ds is below the SSID redundancy threshold (or even zero), it cannot be discarded that the corresponding frames belong to the same user or Wi-Fi device (the Wi-Fi device may have learned a new network or changed the name for an old network, or the SSID may not be stored in the probe request database 232). However, it will be checked if it is feasible to explain the distribution with one more cluster. Therefore, a new k-means clustering iteration is executed supposing one more cluster (i.e., k←k+1).

Figure 15:
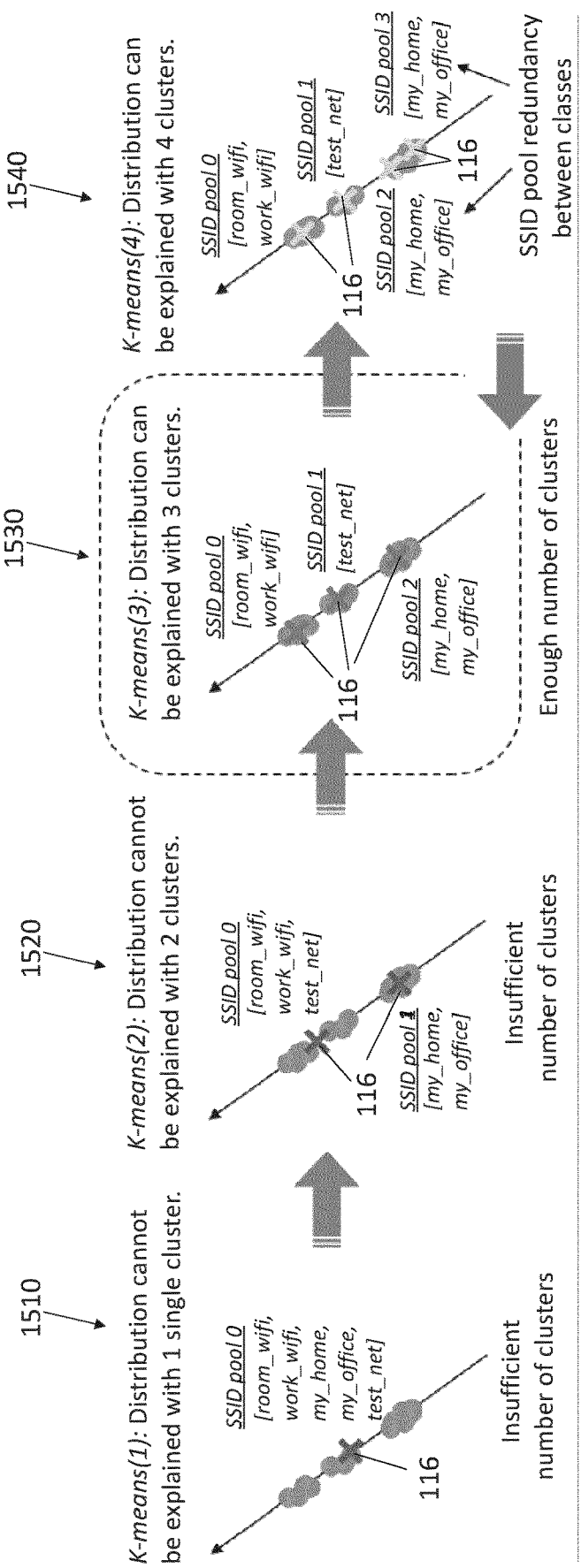
FIG. 15 shows different k-means iterations and fulfillment of a stop condition in the cluster analysis of the projected time series depicted in FIG. 14.

FIG. 15 shows the k-means iterations and the stop condition for different number of clusters 116 (depicted as an "X"). Specifically, the stop rule for the unsupervised clustering algorithm may be the following:
   If the percentage of repeated SSIDs between clusters (with already low aggregated classification error) is above the SSID redundancy threshold, then the number of clusters is decreased until a low redundancy between SSIDs (percentage of repetition below the SSID redundancy threshold) is achieved (while maintaining low aggregated classification error).

In the example of FIG. 15, k-means iterations with k=1 are first performed in step 1510. Only one cluster 116 cannot explain the distribution since the aggregated classification error for k=1 is greater than a classification threshold. New k-means iterations with k=2 are then performed in step 1520, obtaining two clusters 116. Since again the aggregated classification error is greater than the classification threshold, k is increased. In step 1530 three clusters 116 are obtained for k=3. In this case, the aggregated classification error is lower than the classification threshold, and under normal circumstances, the k-means iterations should stop and the output would be the three clusters obtained. However, when using SSID pool information, redundancy of the SSID field between the obtained clusters is further checked. Since the SSID redundancy level between the three clusters 116 is lower than the SSID redundancy threshold, k is increasing by 1 (i.e. an additional k-means clustering iteration considering one more cluster is performed). In step 1540, with k=4, four clusters 116 are obtained. In this case, the aggregated classification error is still lower than the classification threshold. However, the SSID redundancy level for two of the clusters (the ones corresponding to "SSID_pool_2" and "SSID_pool_3") is greater than the SSID redundancy threshold, since the SSID "my_home" and "my_office" are present in both clusters. In that case, the number of clusters is reduced until the redundancy level between the clusters is lower than the SSID redundancy threshold while still maintaining an aggregated classification error lower than the classification threshold, thereby arriving at k=3 fulfilling both conditions. The number of clusters in the example of FIG. 15 is finally 3.

Figure 16:
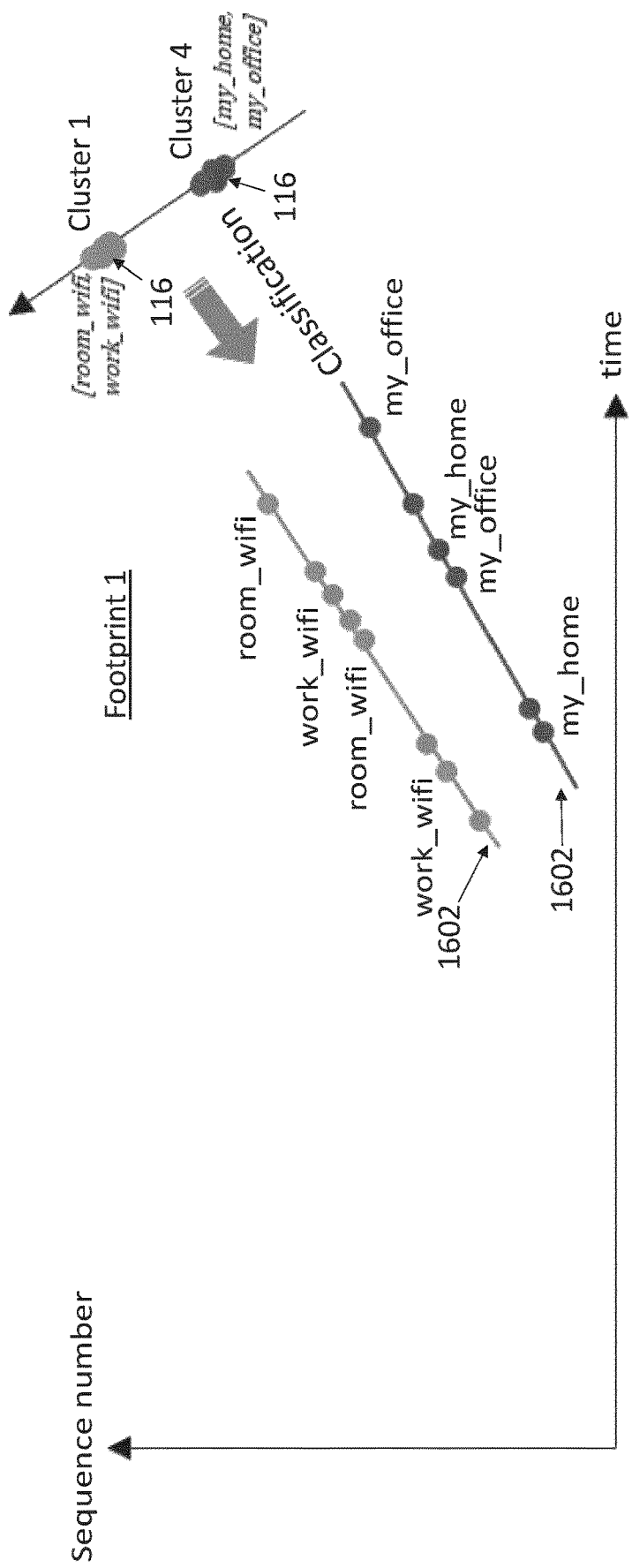
FIG. 16 represents the division of an original time series ("Footprint 1") into two different clustered time series.

Once the clusters 116 are finally obtained, each sample 1104 of the original time series 1102 representation (corresponding to a footprint) is assigned to its corresponding class or cluster. In the example shown in FIGS. 11 and 12, after applying the cluster analysis 114 previously defined, the original time series 1102 of "Footprint 1" is divided into two different classified time series 1602 (i.e. two clusters 116, "Cluster 1" and "Cluster 4", are obtained for the original time series 1102 of "Footprint 1"), as depicted in FIG. 16.

Figure 17:
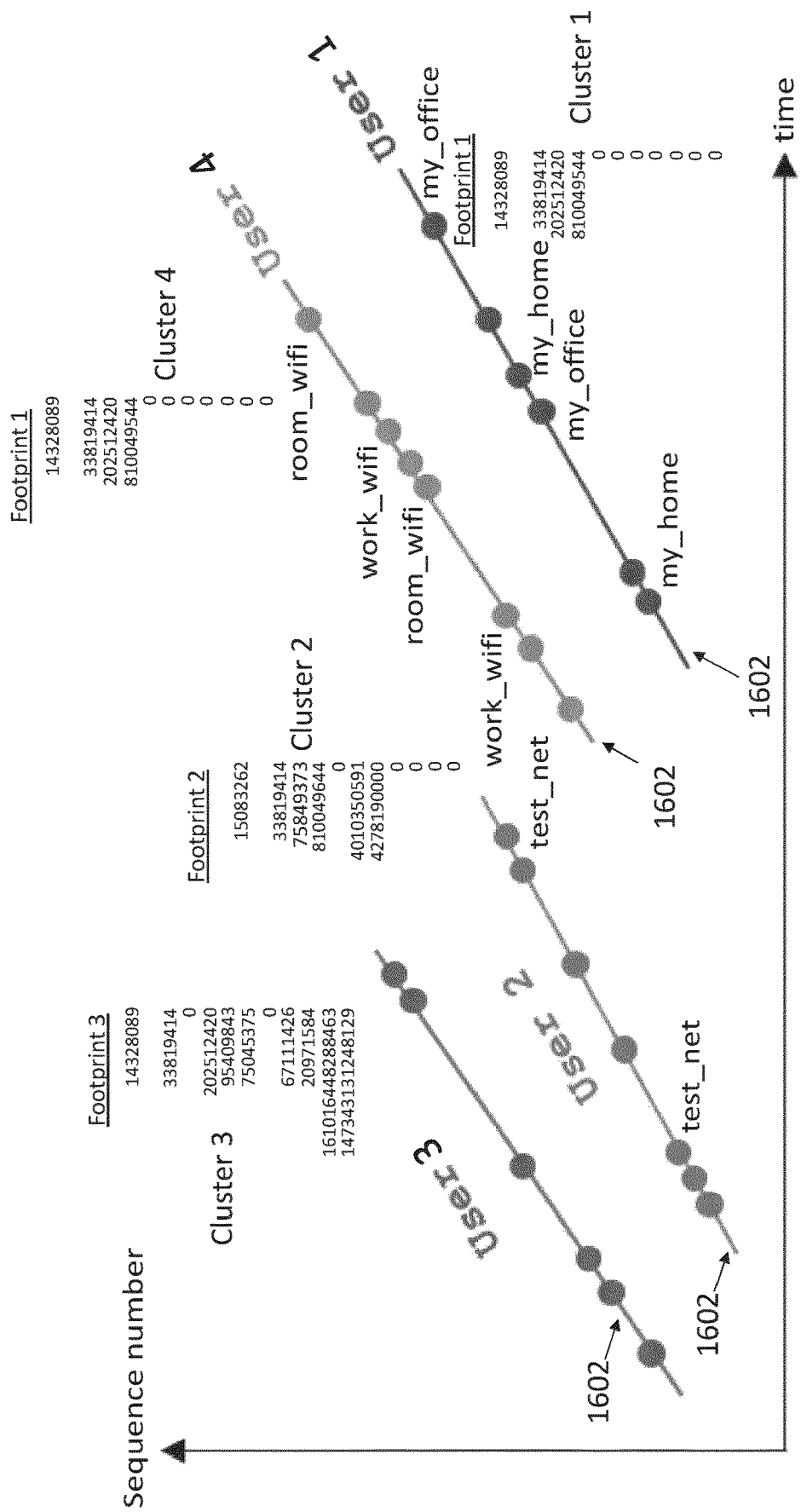
FIG. 17 shows the time series of FIG. 11 clustered as different users.

Finally, each time series (properly classified) corresponds to a specific user or Wi-Fi device 202. In the example of FIG. 11, the time series 1102 of "Footprint 1" is divided into two classified time series 1602, whereas the time series 1102 of "Footprint 2" and "Footprint 3" remain unchanged after the cluster analysis 114, thereby obtaining four different classified time series 1602, as shown in FIG. 17, corresponding to four different clusters 116 found in the cluster analysis 114 (two clusters for "Footprint 1", "Cluster 1" and "Cluster 4", one cluster for "Footprint 2", "Cluster 2", and one cluster for "Footprint 3", "Cluster 3"). A Wi-Fi device 202 is identified 118 for each different cluster 116 found in the time series 1102. Therefore, four different users or Wi-Fi devices 202 are identified in the example of FIG. 17. With this method, various Wi-Fi devices 202 with the same footprint can be distinguished by using the sequence number (and optionally the SSID pool).

FIG. 18 illustrates how finally the clusters are assigned to the split sequences, each one corresponding to one user or Wi-Fi device. The user is univocally identified by the footprint and corresponding cluster. The cluster is tagged by the post-processing of sequence numbers and SSIDs. If there is only one cluster in a footprint, the cluster number may be omitted (it is not needed). A series of notes are herewith presented to make clear the processing of each of the 16 received probe request frames of FIG. 6:

Frame No. 1: unknown footprint, create a new (first) footprint.

Frame No. 2: unknown footprint, create a new (second) footprint.

Frame No. 3: known footprint, assign to the first footprint.

Frame No. 4: known footprint, assign to the first footprint, observe sequence number.

Frame No. 5: unknown footprint, create a new (third) footprint.

Frame No. 6: known footprint (footprint 1), but later split to a new user (user 4) by sequence number and SSID pool.

Frame No. 7: known footprint, assign to the third footprint, no post-processing so decide User 3.

Frame No. 8: known footprint (footprint 1), but sequence number and SSID post-processing decides User 1.

Frame No. 9: known footprint (footprint 1), but sequence number and SSID post-processing decides User 4.

Frame No. 10: unknown footprint, create a new one (footprint 4), later purged and assigned to footprint 1; post-processing decides User 4.

Frame No. 11: unknown footprint, create a new one (footprint 5), later purged and assigned to footprint 1; post-processing decides User 1.

Frame No. 12: known footprint, assign to the second footprint, no post-processing so decide User 2.

Frame No. 13: known footprint (corresponds to frame 10), assign to the first footprint; post-processing decides User 1.

Frame No. 14: known footprint, assign to the third footprint, no post-processing so decide User 3.

Frame No. 15: known footprint, assign to the third footprint, no post-processing so decide User 3.

Frame No. 16: known footprint (footprint 1), but sequence number and SSID post-processing decides User 4.

Finally, FIG. 19 illustrates the description of the users that have been univocally identified in the example. This example shows different casuistry that one can find when gathering probe request frames, including changing of MACs, changing of features and capabilities within the same device, absence of SSID, the concurrence of users with the same model of Wi-Fi device, etc.

In this example, the following numbers are shown:

A lot of probe request frames are received, 16 of them showing random (fake) MAC addresses. Only these frames are processed. There is a bit in the MAC address (7th most significative bit) that specifies if this address is fake or real, which makes trivial this division.

The received frames present up to 9 different (fake) source MAC addresses. A classic MAC-based identification method should account for 9 different users, which is far from true.

There are 5 different footprints initially assigned based on the features (and using tight assignment).

The total number of footprints is finally reduced (in optional steps 416 and 418) down to 3.

The cluster analysis 114, based on sequence number time-series analysis and SSID pool, resulted in 4 real users.

Therefore, the present invention describes how to generate unique footprints or signatures to identify Wi-Fi devices that randomize their MAC address when they are not connected to the network. Unique identification profiles are constructed using both static and dynamic fields within the probe request frames. By projecting the static fields of these frames into the features space, plus further machine-learning-based post-processing using the dynamic fields, it is possible to discern if several of them belong to the same device or not.

The invention claimed is:

1. A method for the unambiguous identification of Wi-Fi devices, the method comprising:
   receiving probe request frames sent by Wi-Fi devices;
   extracting a set of features from a plurality of fields of each probe request frame;
   assigning a footprint to each probe request frame based on the extracted set of features;
   for each footprint, performing a cluster analysis on a time series of sequence numbers included in a header of the probe request frames associated with a corresponding footprint, obtaining at least one cluster per footprint;
   identifying a Wi-Fi device for each different cluster, wherein the cluster analysis comprises:
   performing a principal component analysis on the time series of sequence numbers to obtain a first principal component and a second principal component;
   projecting the time series of sequence numbers over the second principal component;
   classifying the projected time series into clusters.

2. The method of claim 1, wherein the step of classifying the projected time series in clusters comprises a k-means clustering analysis.

3. The method of claim 2, wherein the k-means clustering analysis comprises:
   performing k-means iterations with k=1;
   if an aggregated classification error is greater than a classification threshold, performing further k-means iterations with increasing values of k until the aggregated classification error is lower than the classification threshold.

4. The method of claim 3, wherein the k-means clustering analysis comprises:
   when the aggregated classification error is lower than the classification threshold during the k-means iterations, further calculate a ratio of repeated SSIDs (Service Set Identifier) of the probe request frames between the clusters to obtain a SSID redundancy level;
   if the SSID redundancy level between the clusters is lower than a SSID redundancy threshold, performing additional k-means clustering iterations considering one additional cluster;
   if the SSID redundancy level for two or more clusters is greater than the SSID redundancy threshold, reducing a number of clusters until the SSID redundancy level between the clusters is lower than the SSID redundancy threshold while maintaining an aggregated classification error lower than the classification threshold.

5. The method of claim 1, wherein the extracted set of features at least includes:
   a first three bytes of a source MAC address field of the probe request frame; and
   a first four bytes of a supported rates field of the probe request frame.

6. The method of claim 1, wherein the step of assigning a footprint is performed such that the footprint assigned to two different probe request frames is the same when there is a match on at least a determined number of features within the extracted set of features of both probe request frames.

7. The method of claim 1, wherein the step of assigning a footprint comprises:
for each probe request frame received, checking if at least a determined number of features within the extracted set of features of the received probe request frames matches corresponding features associated with any footprint stored on a probe request database, and in that case assigning the matching stored footprint to the received probe request frames; otherwise, generating a footprint associated with the extracted set of features of the received probe request frames and storing the generated footprint on the probe request database.

8. The method of claim 7, wherein the step of assigning a footprint further comprises:
for each probe request frame received, checking if a source MAC address field of the received probe request frames matches the source MAC address field of any probe request frame stored on the probe request database, and in that case assigning the footprint associated with the matching stored probe request frame to the received probe request frames.

9. A computer program product for the unambiguous identification of Wi-Fi devices, comprising non-transitory computer-readable medium having recorded thereon computer code instructions that, when executed by a processor, cause the processor to perform the method of claim 1.

10. A device for the unambiguous identification of Wi-Fi devices, the device comprising:
a Wi-Fi interface configured to operate in monitor mode to listen to probe request frames sent by Wi-Fi devices;
a processor configured to:
extract a set of features from a plurality of fields of each probe request frame received by the Wi-Fi interface;
assign a footprint to each probe request frame based on the extracted set of features;
for each footprint, perform a cluster analysis on a time series of sequence numbers included in a header of the probe request frames associated with a corresponding footprint to obtain at least one cluster per footprint;
identify a Wi-Fi device for each different cluster,
wherein for performing the cluster analysis the processor is configured to:
perform a principal component analysis on the time series of sequence numbers to obtain a first principal component and a second principal component;
project the time series of sequence numbers over the second principal component;
classify the projected time series in clusters.

11. The device of claim 10, wherein for classifying the projected time series in clusters the processor is configured to perform a k-means clustering analysis.

12. The device of claim 11, wherein for performing the k-means clustering analysis the processor is configured to:
perform k-means iterations with k=1;
if an aggregated classification error is greater than a threshold, perform further k-means iterations with increasing values of k until the aggregated classification error is lower than a threshold.

13. The device of claim 12, wherein for performing the k-means clustering analysis the processor is configured to:
check redundancy of the SSID (Service Set Identifier) field of the probe request frames in different clusters during the k-means iterations;
if the SSID redundancy level for two or more clusters is greater than a given SSID redundancy threshold, merge said clusters into one cluster.

14. The device of claim 10, wherein the extracted set of features at least includes:
a first three bytes of a source MAC address field of the probe request frame; and
a first four bytes of a supported rates field of the probe request frame.

15. The device of claim 10, wherein the processor is configured to assign the footprint such that the footprint assigned to two different probe request frames is the same when there is a match on at least a determined number of features within the extracted set of features of both probe request frames.

16. The device of claim 10, further comprising a memory with a probe request database for storing the extracted set of features and the footprint assigned to each probe request frame.

17. The device of claim 16, wherein for assigning a footprint the processor is configured to:
for each probe request frame received, check if at least a determined number of features within the extracted set of features of the received probe request frames matches corresponding features associated with any footprint stored on the probe request database, and in that case assign the matching stored footprint to the received probe request frames; otherwise, generate a footprint associated with the extracted set of features of the received probe request frames and store the footprint on the probe request database.

18. The device of claim 17, wherein for assigning a footprint the processor is further configured to:
for each probe request frame received, check if the source MAC address field of the received probe request frames matches the source MAC address field of any probe request frame stored on the probe request database, and in that case assign the footprint associated with the matching stored probe request frame to the received probe request frames.

* * * * *